(12) United States Patent
Zuberi

(10) Patent No.: US 8,116,317 B2
(45) Date of Patent: Feb. 14, 2012

(54) PREVENTING QUALITY OF SERVICE POLICY ABUSE IN A NETWORK

(75) Inventor: Khawar M. Zuberi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 11/275,848

(22) Filed: Jan. 31, 2006

(65) Prior Publication Data

US 2007/0177610 A1 Aug. 2, 2007

(51) Int. Cl.
*H04L 12/56* (2006.01)
*H04L 12/28* (2006.01)
*H04N 7/18* (2006.01)
*G06F 15/173* (2006.01)

(52) U.S. Cl. ............... 370/395.42; 370/230; 725/78; 709/224; 709/226

(58) Field of Classification Search .......... 725/78, 725/80, 81, 141; 709/224, 226, 231; 370/230, 370/395.42
See application file for complete search history.

(56) References Cited

U.S. PATENT DOCUMENTS

| | | | |
|---|---|---|---|
| 6,816,456 B1 * | 11/2004 | Tse-Au ................. | 370/230.1 |
| 7,260,555 B2 * | 8/2007 | Rossmann et al. .......... | 705/51 |
| 7,383,343 B2 * | 6/2008 | Mazzola .................. | 709/228 |
| 7,412,538 B1 * | 8/2008 | Eytchison et al. ......... | 709/245 |
| 7,664,856 B2 * | 2/2010 | Bowra et al. ............. | 709/225 |
| 7,675,856 B2 | 3/2010 | Padmanabhan et al. | |
| 2002/0140851 A1 * | 10/2002 | Laksono ................ | 348/388.1 |
| 2003/0107590 A1 * | 6/2003 | Levillain et al. ......... | 345/736 |
| 2003/0194968 A1 * | 10/2003 | Young ................... | 455/45 |
| 2003/0208777 A1 * | 11/2003 | Danker et al. ........... | 725/135 |
| 2004/0190528 A1 * | 9/2004 | Dacosta ................ | 370/395.41 |
| 2005/0008074 A1 * | 1/2005 | van Beek et al. ........ | 375/240.01 |
| 2005/0015805 A1 * | 1/2005 | Iwamura ................ | 725/79 |
| 2005/0025148 A1 * | 2/2005 | Johansson et al. ......... | 370/389 |
| 2005/0114901 A1 * | 5/2005 | Yui et al. .............. | 725/100 |
| 2005/0262258 A1 * | 11/2005 | Kohno et al. ............ | 709/231 |
| 2006/0010492 A9 * | 1/2006 | Heintz et al. ........... | 726/23 |
| 2006/0031459 A1 * | 2/2006 | Ahn et al. ............. | 709/224 |
| 2006/0080707 A1 * | 4/2006 | Laksono ................ | 725/38 |
| 2006/0095943 A1 * | 5/2006 | Demircin et al. ......... | 725/81 |
| 2006/0168203 A1 * | 7/2006 | Levillain et al. ......... | 709/224 |
| 2006/0174121 A1 * | 8/2006 | Omae et al. ............ | 713/172 |
| 2006/0239190 A1 * | 10/2006 | Kumar et al. ........... | 370/230 |
| 2006/0251116 A1 * | 11/2006 | Bedingfield et al. ....... | 370/468 |
| 2007/0027983 A1 * | 2/2007 | Bowra et al. ........... | 709/224 |
| 2007/0058612 A1 * | 3/2007 | Bushmitch ............. | 370/352 |
| 2007/0061443 A1 * | 3/2007 | Chavda ................ | 709/224 |
| 2007/0107020 A1 * | 5/2007 | Tavares ................ | 725/81 |
| 2007/0110012 A1 * | 5/2007 | Abu-Amara ............ | 370/338 |
| 2008/0310301 A1 * | 12/2008 | Wade et al. ............ | 370/230 |

* cited by examiner

*Primary Examiner* — Ayaz Sheikh
*Assistant Examiner* — Hoang-Chuong Vu

(57) ABSTRACT

A system for preventing quality of service policy abuse comprising a media connection and a local area network prioritizing quality of service in which quality of service to a to a video receiver or similar device may be maintained by prioritizing its signal relative to other signals competing for network bandwidth.

20 Claims, 7 Drawing Sheets

PRIOR ART   FIG. 1

PREVENTING QUALITY OF SERVICE POLICY ABUSE IN A NETWORK

BACKGROUND

This description relates generally to networks and more specifically to computerized home networks.

Networks may be used to couple AV equipment, and transmit signals to that AV equipment. AV signals are typically high bandwidth signals. Some types of AV signals may take more bandwidth than others causing further constraints on a network's finite bandwidth. Also as networks become more popular as a way of delivering AV signals further demands may be put on network bandwidth.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a way to maintain quality of service in a network. Traffic monitoring in conjunction with methods of detecting policy violators may be used to allow prioritized signals to be provided to designated AV equipment.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a local area network with support for quality of service 225 (of FIG. 2), i.e., the local area network has the capability to prioritize some traffic over other traffic. Although the present examples are described and illustrated herein as being implemented in a wireless home network system, the system described is provided as an example and not a limitation. As those skilled in the art will appreciate, the present examples are suitable for application in a variety of different types of network systems.

Figure 1:
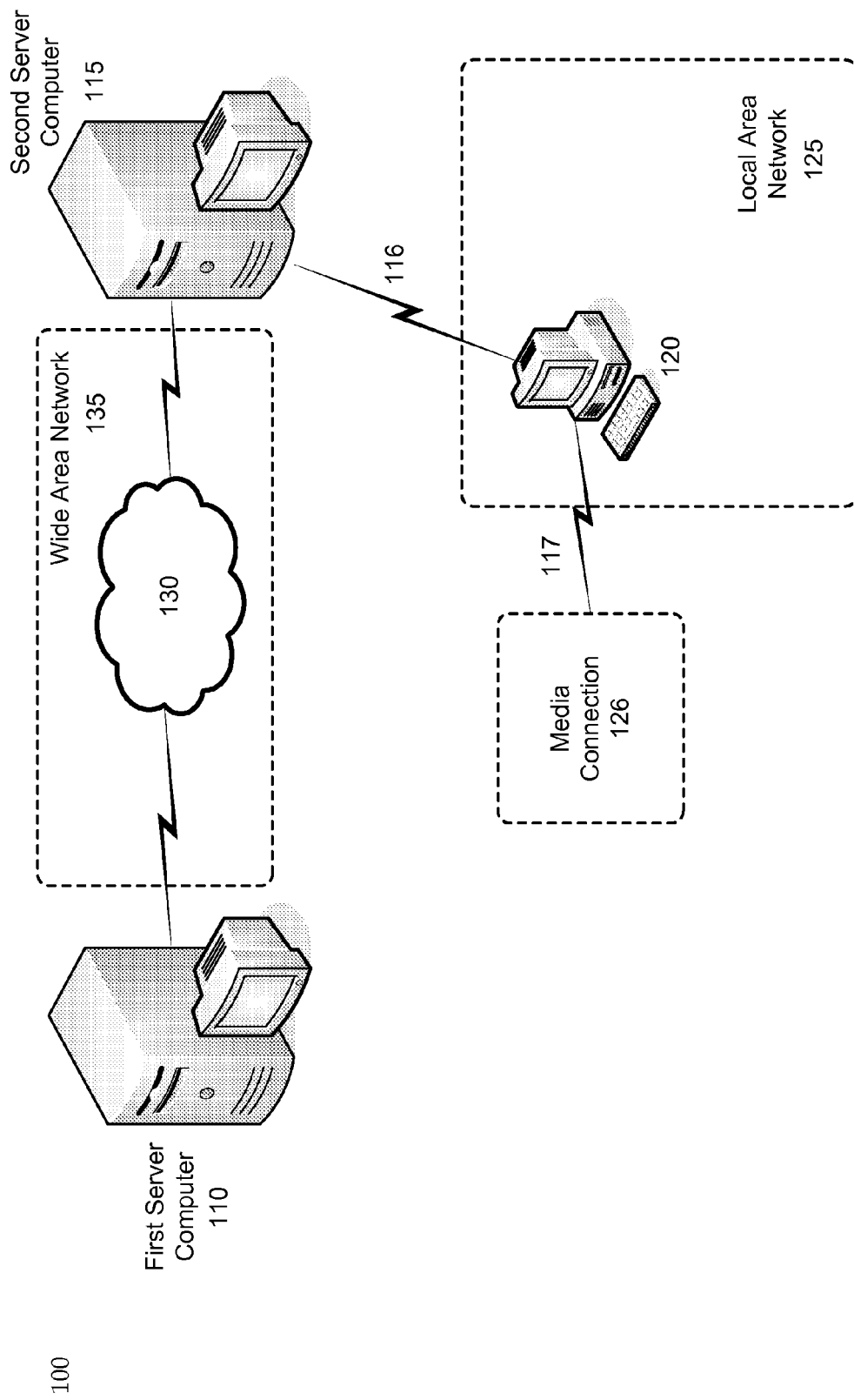
FIG. 1 is a block diagram of a conventional network.

FIG. 1 is a block diagram of a conventional network 100. Computer 115 is a server computer coupled to a user's computer 120 through a conventionally constructed local area network 125. This network is typical of networks that may include a typical home network.

In the local area network the users computer is typically part of the local area network 125 which may include a plurality conventional computers (not shown) and conventional peripheral equipment (not shown) coupled together utilizing topologies (token, star and the like) and switching equipment known to those skilled in the art. Alternatively such a local area network may be called a home network, wireless network or the like. Coupling may be achieved by wireless technology the may couple some or all of the network components together through various standards known to those skilled in the art. Those skilled in the art will realize that other processor equipped devices such as televisions and VCRs with electronic program guides, cellular telephones, appliances and the like may be coupled to the internet utilizing conventional techniques known to those skilled in the art. In the case of television or video signals being transferred over the local area network large portions of the available network bandwidth may be consumed by transferring these signals. Even with compression technologies transferring one or more of these signals may take up considerable network bandwidth. With the advent of high definition video signals even higher demands on network bandwidth may be made.

A typical local area network 125 may include a conventionally constructed link 117 to a media source 126, and a PC 120 that is part of the local area network. A PC that includes a link to media may be called a media center, multimedia capable PC or the like. Such a PC may be capable of receiving digital, or analog signals and may be capable of converting or passing them unchanged over the local area network.

A typical local area network 125 may include a conventionally constructed ISP network in which a number or plurality of subscribers utilize telephone dial up, ISDN, DSL, cellular telephone, cable modem, or the like connections 116 to couple their computer to one or more server computers 115 that provide a connection to the world wide web 135 via the internet 130.

Wide area network or world wide web 135 is conventionally constructed and may include the internet 130 or equivalent coupling methods for providing a wide area network. As shown a conventionally constructed first server computer 110 is coupled to conventionally constructed second server computer 115 through a conventionally constructed internet connection to the world wide web 130.

Figure 2:
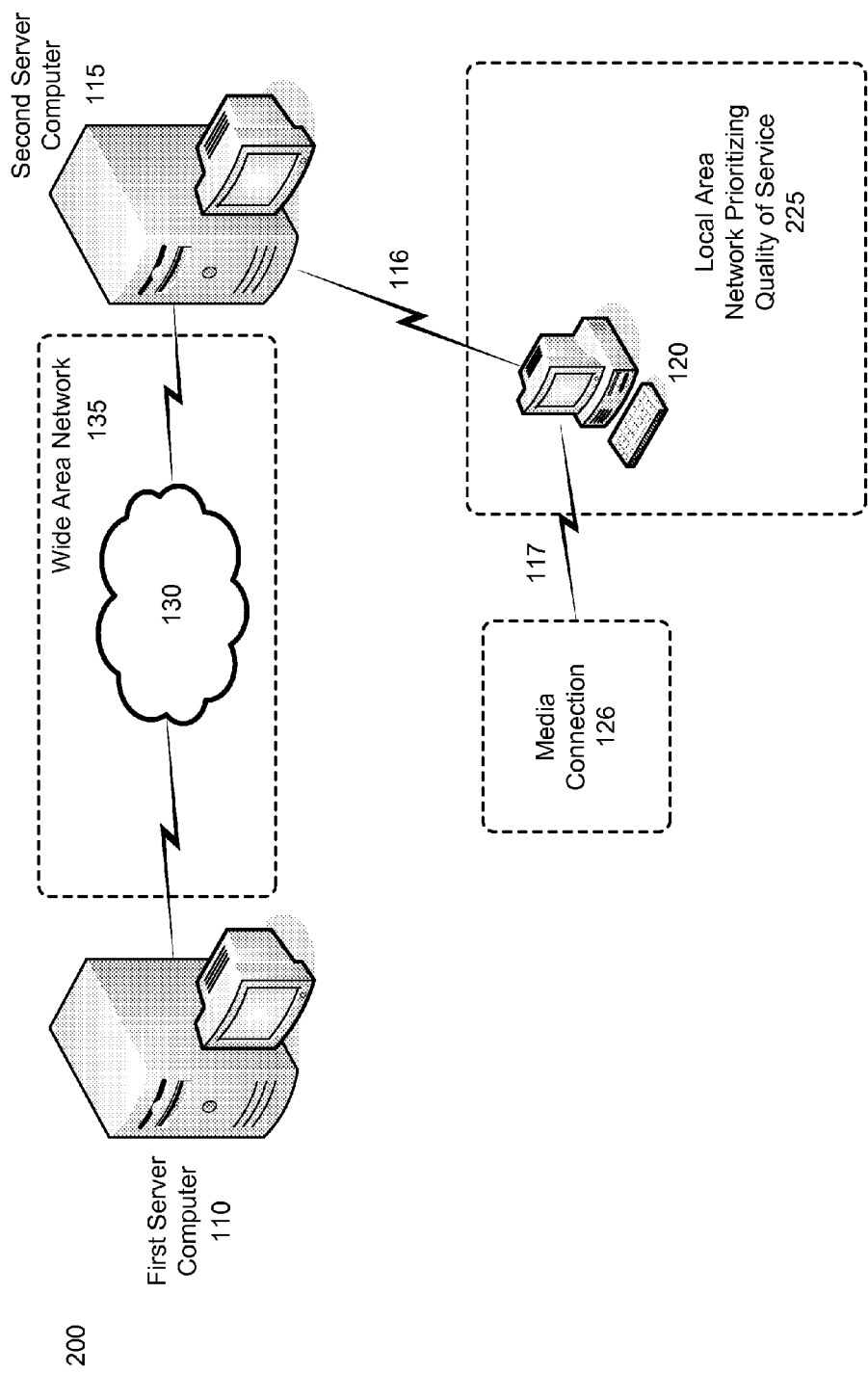
FIG. 2 is an exemplary network including a local area network prioritizing quality of service.

FIG. 2 is an exemplary network 200 including a local area network prioritizing quality of service 225. As shown a local area (or home) network providing quality of service 225 may be coupled to the internet via link 116. The local area (or home) network providing quality of service 225 may also be coupled to the media connection 126 via link 117. Typically links 116, 117 couple to a PC, media center, processor based hardware or the like 120 that is part of the local area network providing quality of service. Typically the media connection 126 includes one or more sources of high bandwidth content that is being delivered to one or more sinks (such as televisions and the like) disposed within the home network 225.

The local area (or home) network providing quality of service 225 typically includes a traffic monitoring service that may prevent certain types of policy abuse by different components that may be present in the home network.

Figure 3:
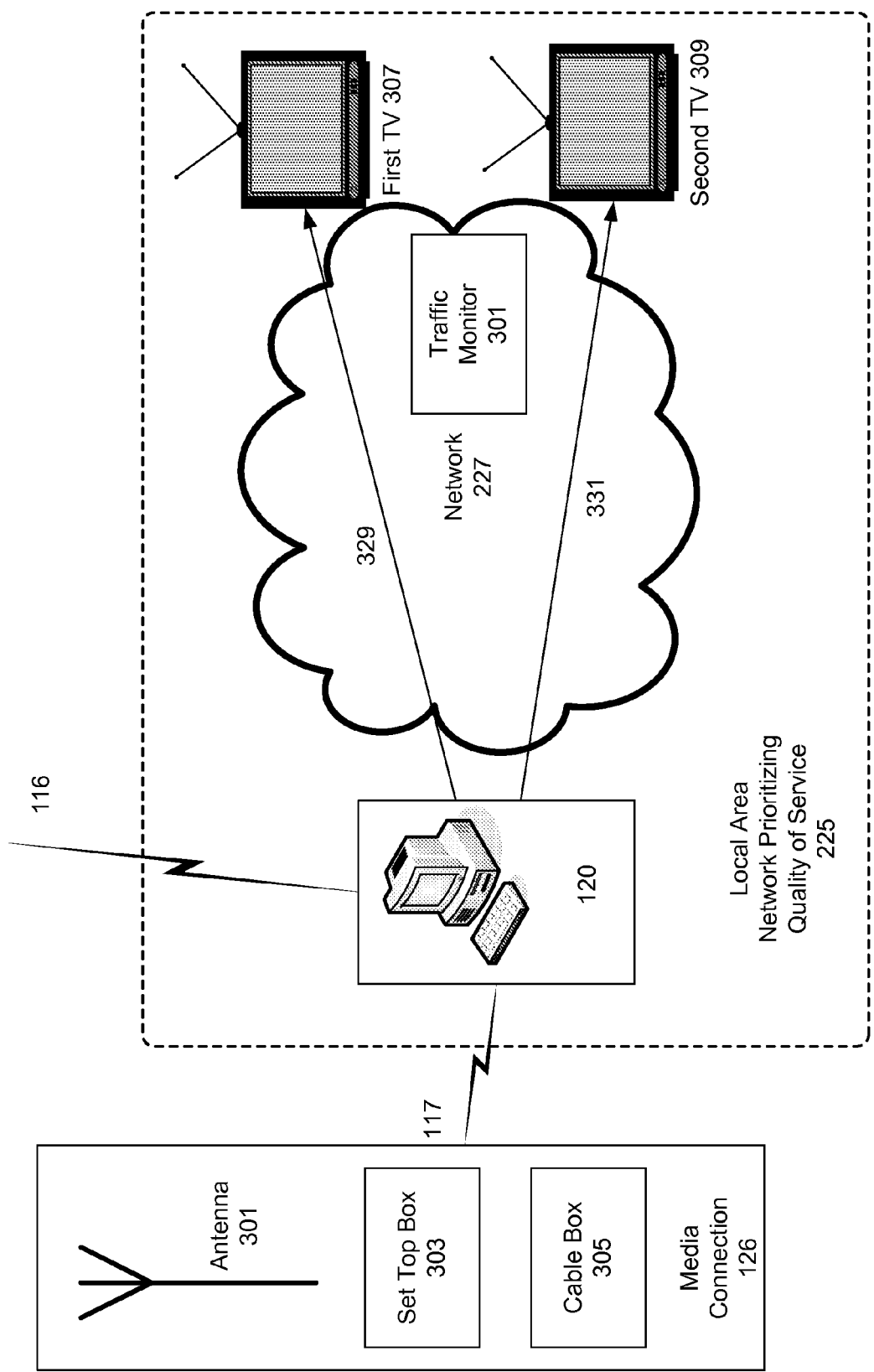
FIG. 3 is a diagram showing further details of the local area network prioritizing quality of service and the media connection.

FIG. 3 is a diagram showing further details of the local area network providing quality of service 225 and the media connection 126. As shown a media connection 126 may include one or more sub components such as an antenna 301, a set top box 303, a cable box 305 or the like. It is contemplated that any type of media signal such as a video signal, High definition video signal or the like, whether analog or digital may be supplied over link 117 to PC 120.

Local area network providing quality of service 225 may include PC 120 coupled 329, 331 to one or more consumer electronics devices such as first television ("TV1") 307, and second television ("TV2") 309. The televisions are capable of receiving digital signals that may include high definition video signals. Network 227 is typically a wireless network that facilitates the transfer of signals 329, 331 between network components 120, 307, 309.

A home network may be overloaded by too many audio visual devices being coupled to it. Thus a user that hooks up a high definition TV to a home network may not receive a high definition picture due to network overload. Overload could be caused by too many TVs coupled to the network that are all calling for high definition signals that tend to use large amounts of bandwidth. By setting priorities for the audio visual devices coupled to the network, and providing a way of implementing those priorities network overload may be managed, The present examples describe how audio visual devices coupled to a home network may share the network by implementing a policy that determines the quality of service that the various audio visual devices will be provided with. In the examples below a system of providing quality of service may be provided by a user interface to configure the home network and by the implementation of methods to disseminate the policy information via a communications protocol.

In a home networking environment, various audio visual ("AV") devices can be coupled by the network. AV devices may include TVs, High Definition Televisions, Audio components and the like. These AV devices may share the network bandwidth (for example the case of shared network media such as WiFi and the like). When two or more AV devices are coupled to a network the quality of a signal provided to the AV device may be degraded. Degradation may occur because there is insufficient network bandwidth to transmit a good quality signal to each AV device. Also, overloading a network's bandwidth may not allow a high, or premium, quality signal to be transmitted because there is simply not enough bandwidth available to support the other devices and the AV device requesting the high quality signal. To ensure quality of the AV streams to the various AV devices, there may be a need for coordination between these devices to set priorities.

As an example of setting priorities where bandwidth may be shared, suppose an AV stream (such as live TV) is being streamed from one source device (such as a PC) to another sink device (such as a TV capable to receiving and displaying the AV stream). Now suppose that another member of the household wants to start another TV stream to another TV within the home. Also suppose that the home network can only sustain one bandwidth at a time, but not both.

To resolve situations like these, the home users may set certain policies which may be implemented as a method that regulates network behavior in the event of insufficient network bandwidth. An example of a policy might be that the, "Stream to TV1 is more important than TV2. So, if TV1 is already on and someone tries to start TV2, then don't start TV2. Or, if TV2 is already on and someone tries to start TV1, then ensure best quality AV stream for TV1, even if TV2's stream quality suffers."

As may be seen from the discussion above policy violations may lead to poor user experience. Furthermore, policy violations can cause user confusion as to the source of the problem. The problem may arise from the network or the AV device, and thus the user may need help in figuring out the exact source of the problem.

In order to make this method of bandwidth sharing work well for home users, certain features are may be desirable. First, policies for an AV stream for some device should be settable from that device. The user should not be forced to go to every device and set that policy, or to have to go to a central device to set that policy. To do this a communication protocol to allow various devices to exchange policy information may be provided. Second, the policy setting mechanism should be secure so that no (malicious or malfunctioning) device attached to the home network can violate policy and get away with it.

Policy Violations

The examples described below typically prevent policy violations. Policy violations can take two forms. The first form of policy violations may especially be prevented by the examples provided. First, some (malicious or malfunctioning) device communicates the wrong policy to other devices. For example, the user may set a policy that this device is "less important" than some other device, but the device tells other devices that it is of "high importance". Second, some (malicious or malfunctioning) device does not abide by policy settings when using the network's bandwidth. For example, policy may indicate that this device should send its AV stream at low network priority, but this device ignores that and sends its AV stream at high network priority. "Network priority" is typically a technology included in many new home networks, including WiFi networks. With network priority applied devices which send network traffic specify a priority value for each packet. Traffic with higher priority is able to get more bandwidth than traffic at lower priorities.

Distributing Policy Information

In the examples provided policy for an AV stream can only be set on either the source device or the sink device for a given stream. In practice, if policy is set on the sink device, it will usually convey policy to the source device which will then take the rest of the actions described in this section. In this initial stage a typical user interface ("UI") may be provided to configure the network. Such a UI may be provided on the AV devices, or any PCs coupled to the network such as a media center PC or the like.

When a user sets a policy on a device, that device directly communicates this policy directly to all other devices on the home network. This particular implementation typically aids in the detection of policy violators. In this implementation the communication of policy may be done via a protocol such as TCP to prevent the sender from hiding its identity (i.e., prevent IP spoofing). A weak-security protocol such as UDP should not be used for communicating policies.

In an alternative example the AV device conveys the policy setting to some centralized policy holder device, which then forwards the information to all other devices.

Coordination Between AV Sources to Abide by Policy

As a result of the policy distribution scheme described above, each AV device coupled to the network is aware of all policy settings for all devices/streams. When there's enough network bandwidth to run all on-going streams, then policy settings may be ignored. Only when there's insufficient network bandwidth do policy settings tend to come into play. Using the example of TV1 and TV2 described previously, we describe two cases below in FIG. 4 and FIG. 5.

Figure 4:
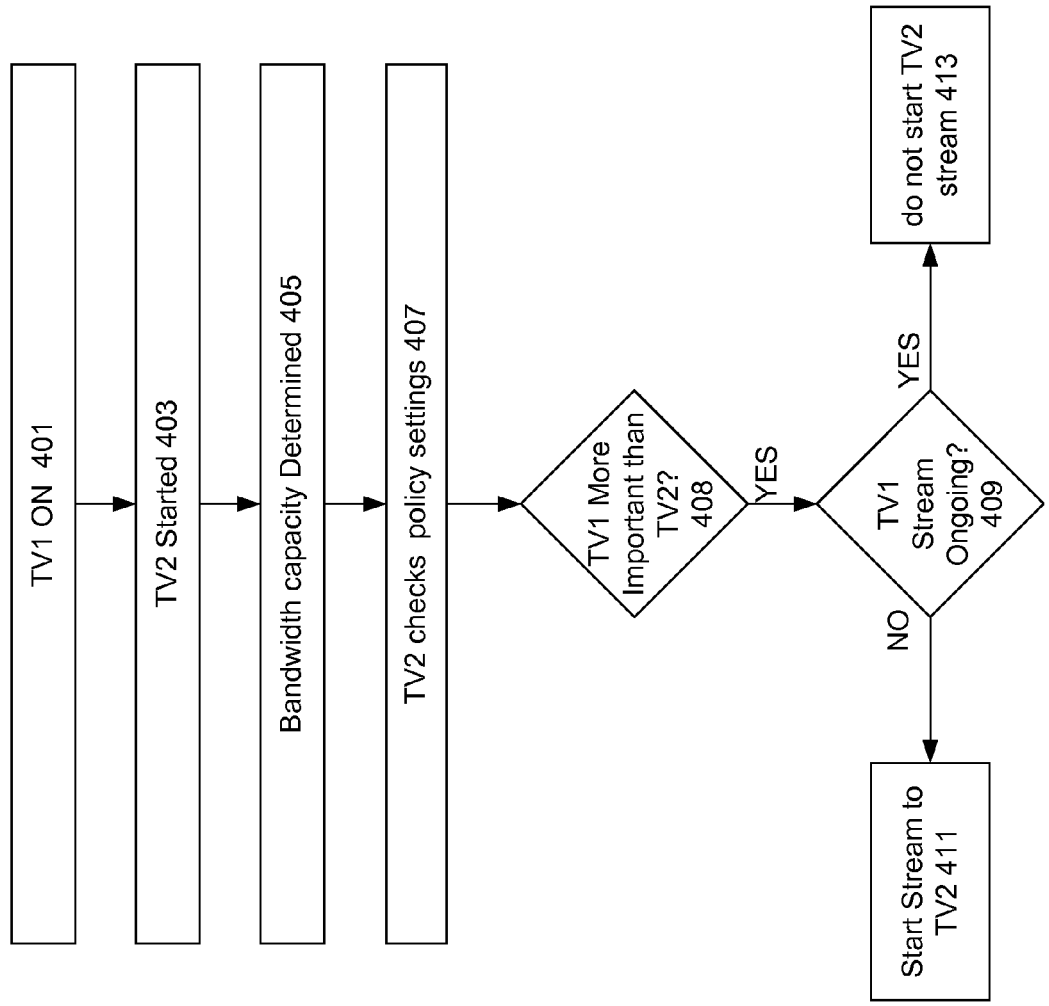
FIG. 4 is a flow diagram showing a local area network prioritizing quality of service when TV1 is turned on first.

FIG. 4 is a flow diagram showing a local area network providing quality of service when TV1 is turned on first 401. The first case is where TV1 is already on and someone tries to start TV2 403. First, the source device streaming to TV2 should realize that there is insufficient network bandwidth to start this new stream 405. This realization can come in several ways, for example, by using bandwidth estimation techniques such as ProbeGap which is disclosed in U.S. patent application Ser. No. 11/089,246, filed Mar. 24, 2005, the contents of which are incorporated herein by reference. Alternatively, TV2 can start the stream and then realize that it cannot pump data fast enough (because there isn't enough free network bandwidth) to display TV properly.

Next, the source device for TV2 then consults the policy settings 407 and sees that the user has configured TV1 as more important than TV2 408. The source device for TV2 typically needs some way to know that TV1 stream is currently on-going 409. This can be accomplished in various ways, such as, when a source device starts/stops an AV stream, it informs all other devices of this fact. We call this "information sharing." As a result, source device for TV2 does not start the stream. Instead, it informs the user that stream for TV1 is on-going 413.

Figure 5:
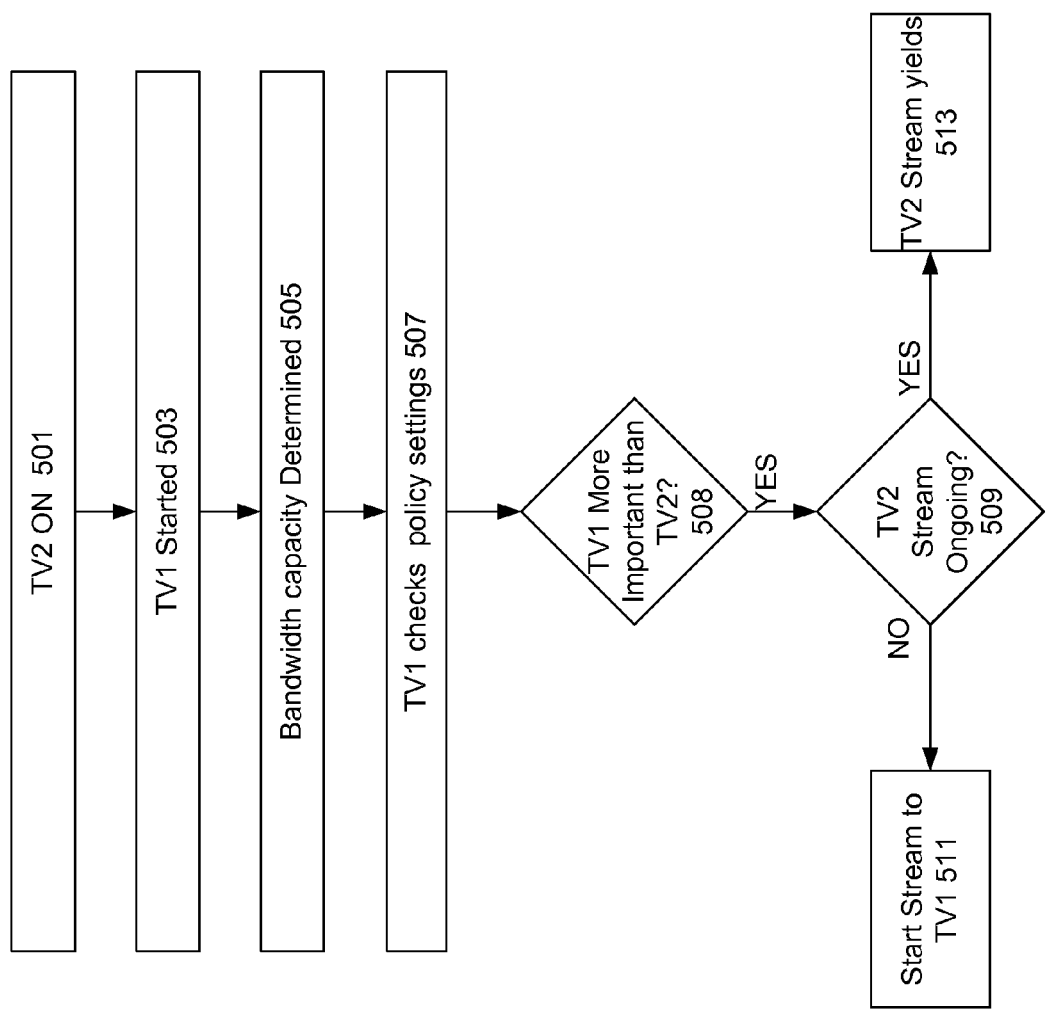
FIG. 5 is a flow diagram showing a local area network prioritizing quality of service when TV2 is turned on first.

FIG. 5 is a flow diagram showing a local area network providing quality of service when TV2 is turned on first. The second case is where TV2 is already on 501 and someone tries to start TV1 503. First, the source device streaming to TV1 should realize that there is insufficient network bandwidth to start this new stream 505. This realization can come in several ways, for example, by using bandwidth estimation techniques such as ProbeGap which is disclosed in U.S. patent application Ser. No. 11/089,246, filed Mar. 24, 2005, the contents of which are incorporated herein by reference. Alternatively, TV1 can start the stream and then realize that it cannot pump data fast enough (because there isn't enough free network bandwidth) to display TV properly.

Next, the source device for TV1 then consults the policy settings 507 and sees that the user has configured TV1 as more important than TV2 508. The source device for TV1 typically needs some way to know that TV2 stream is currently on-going 509. This can be accomplished by various means, such as, when a source device starts/stops an AV stream, it informs all other devices of this fact. We call this "information sharing." As a result, source device for TV1 sends a message to the source device for TV2, asking the later to yield network bandwidth 513. The source device for TV2 can yield network bandwidth in several ways, e.g., it can stop the stream to TV2, or, it can send the TV2 stream at a lower network priority. The source device for TV2 complies and yields network bandwidth, and this allows the stream for TV1 to run at full quality.

In all of the above cases, "TV1" can be replaced with "a stream designated (via policy settings) as high-importance by the user" and "TV2" can be replaced with "one or more streams designated (via policy settings) as low-importance by the user"

It's possible that two streams may try to start and they've been designated as the same level of importance by the user. If network bandwidth is insufficient to start both streams, then the user can be prompted at this point to further finesse the policy setting, e.g., pick one of the streams as being more important than the other one.

Detecting Policy Violations with Network Diagnostics

In implementing the method previously described it may be easy to violate policy. Each device can tell other devices that its streams are the most important. This can lead to chaos if too many devices did this, rendering policy settings useless.

To address this, we realize that in the home environment (as opposed to a large corporate network environment), the home user can be relied upon to take some simple actions to resolve problems such as these. As long as the actions are clear and simple, the user can take those actions.

So, instead of trying to prevent policy violations thru some automatic means, we take the approach of being able to reliably identify policy violators and informing the home user of these violators. Then the home user can then take appropriate action (such as turn off the culprit device).

Policy violators can be detected via a traffic monitoring service. Networking hub/switch devices such as WiFi APs are well-suited for implementing such a service. This service simply tracks the number of bytes sent to/from each device connected to the hub/switch. Devices can be identified by their MAC addresses. The service maintains traffic statistics for each priority level supported by the switch/hub. For example, WMM WiFi APs support 4 priority levels, so such a service will maintain eight counters for each MAC address known to the AP, i.e., two counters per priority level: one for bytes sent and other for bytes received.

Figure 6:
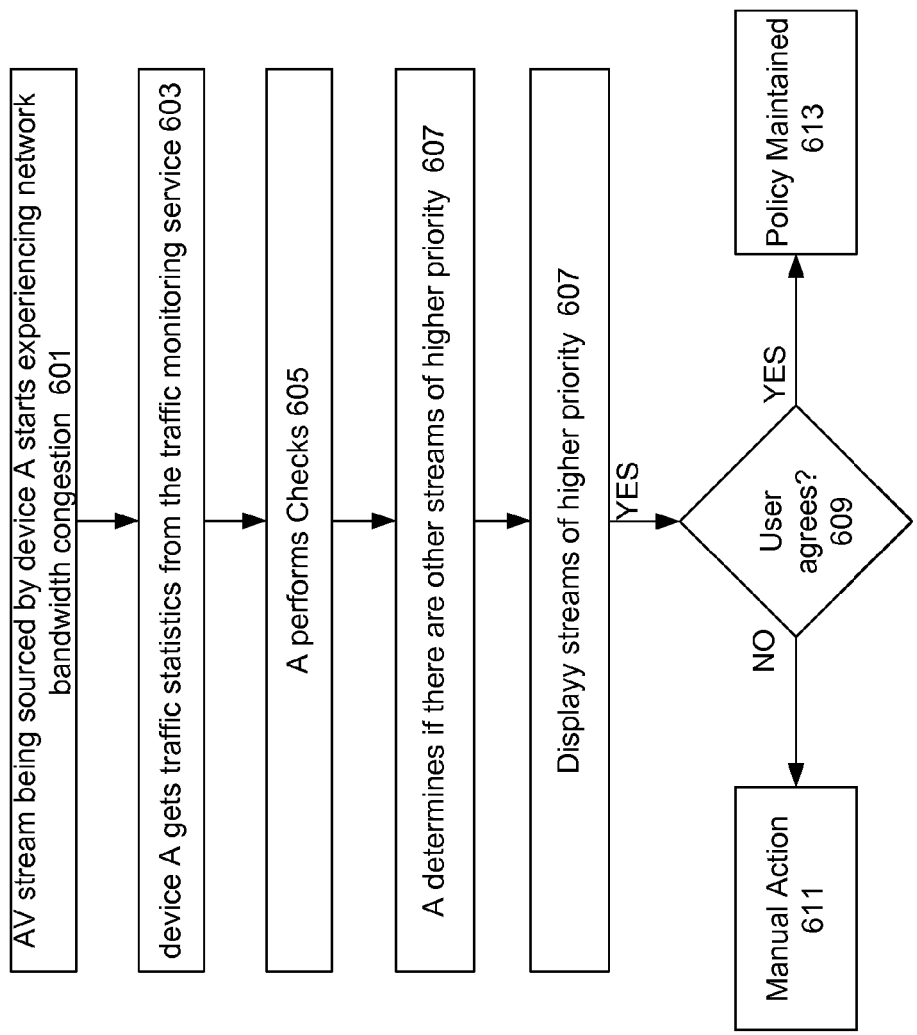
FIG. 6 is a flow diagram showing the process of traffic monitoring for ensuring quality of service prioritization.

FIG. 6 is a flow diagram showing the process of traffic monitoring for ensuring quality of service prioritization. The traffic monitoring service can be used to detect policy violators for the case of a well-behaved source device A connected to the home network. First an AV stream being sourced by device A starts experiencing network bandwidth congestion 601. At this point, as part of diagnosing the problem, device A gets traffic statistics from the traffic monitoring service 603.

From these statistics, device A can check 605 three things. First if all other source devices are running their streams at the bandwidths advertised in their "information sharing" messages. Second, if all other source devices are running their streams at the network priority consistent with policy advertised by those devices. Third, from these checks, device A can detect if some device is not abiding by policy (i.e., policy violation type 2)

If all devices are abiding by policy, device A can check if, according to policy, there are other on-going streams of higher network priority 607. If so, device A can display to its user that such and such other streams are running, and these streams have been configured (by a home user) to have higher network priority that device A's stream 607.

If the user does not agree with these policy settings, the user now has exact information to take manual action 611 to remedy the situation. This way, (malicious or malfunctioning) devices indulging in policy violation type 1 listed above can be reliably identified to the user. The identification is reliable because each device communicates its policy information directly to all other devices (without going thru any intermediaries). So, if some (malicious or malfunctioning) device X advertises a fake policy to other devices (including device A), then because device A receives this policy directly from device X via TCP (i.e., device X cannot do IP spoofing), device A can reliably tell the home user that the source of this policy is device X. If the user agrees policy may be maintained 613.

Figure 7:
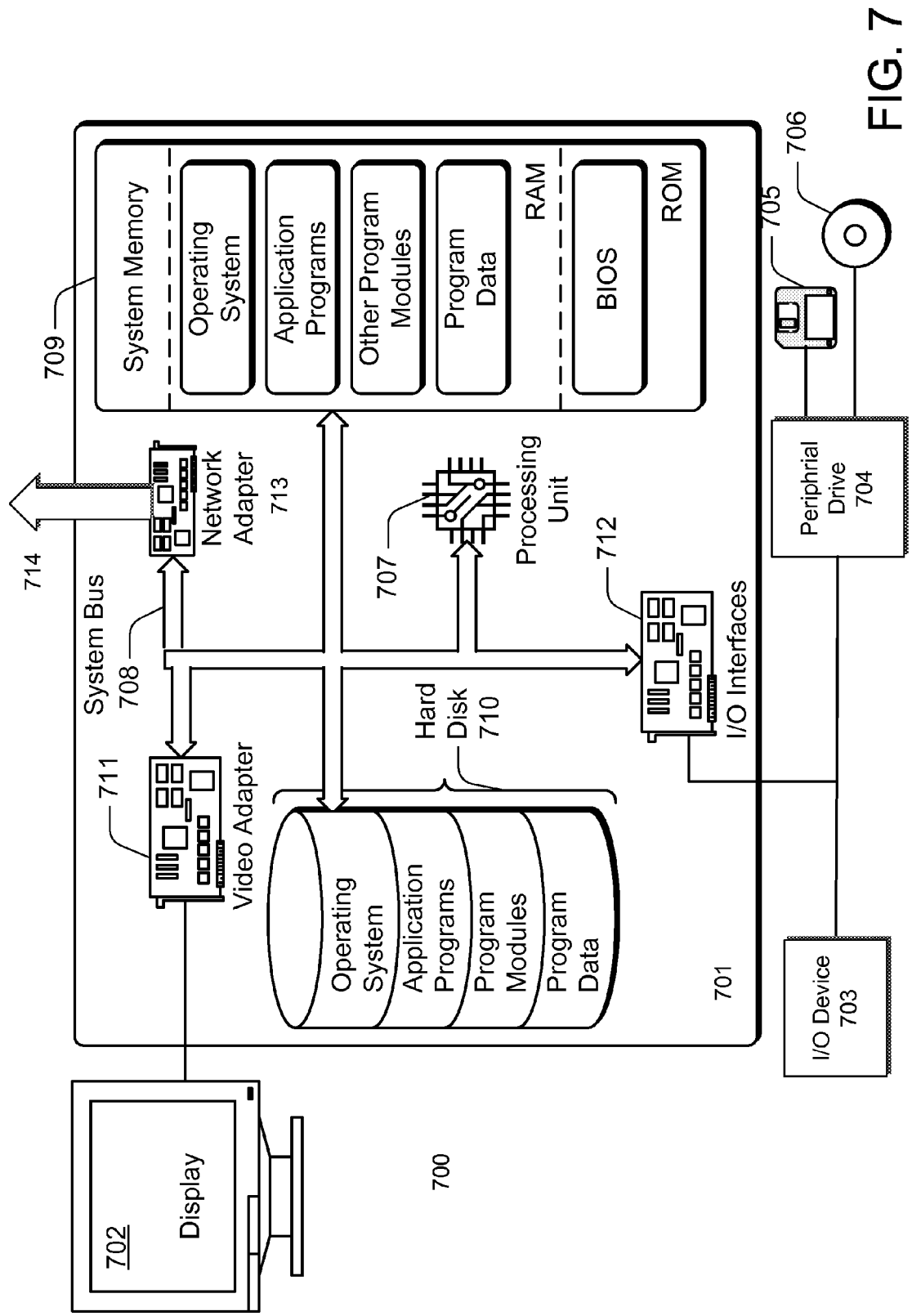
FIG. 7 illustrates an exemplary computing environment in which the method of prioritizing quality of service described in this application, may be implemented.

Another approach to preventing policy violations of type 1 would be to use some authentication scheme. Under this approach, a user U configuring policy will also be required to enter some sort of password, which will then be used to encrypt the policy. Then, when the policy is conveyed to other devices, those devices can verify that indeed user U is the one who configured the policy. Note that this scheme typically requires a security infrastructure within the home network and has all home devices participate in that infrastructure, FIG. 7 illustrates an exemplary computing environment 700 in which the method of providing quality of service described in this application, may be implemented. Exemplary computing environment 700 is only one example of a computing system and is not intended to limit the examples described in this application to this particular computing environment.

For example the computing environment 700 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 700 includes a general-purpose computing system in the form of a computing device 701. The components of computing device 701 can include one or more processors (including CPUs, GPUs, microprocessors and the like) 707, a system memory 709, and a system bus 708 that couples the various system components. Processor 707 processes various computer executable instructions, including those to ** to control the operation of computing device 701 and to communicate with other electronic and computing devices (not shown). The system bus 708 represents any number of several types of bus structures, including a memory bus or memory controller, a peripheral bus, an accelerated graphics port, and a processor or local bus using any of a variety of bus architectures.

The system memory 709 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 707.

Mass storage devices 704 may be coupled to the computing device 701 or incorporated into the computing device by coupling to the buss. Such mass storage devices 704 may include a magnetic disk drive which reads from and writes to a removable, non volatile magnetic disk (e.g., a "floppy disk") 705, or an optical disk drive that reads from and/or writes to a removable, non-volatile optical disk such as a CD ROM or the like 706. Computer readable media 705, 706 typically embody computer readable instructions, data structures, program modules and the like supplied on floppy disks, CDs, portable memory sticks and the like.

Any number of program modules can be stored on the hard disk 710, Mass storage device 704, ROM and/or RAM 709, including by way of example, an operating system, one or more application programs, other program modules, and program data. Each of such operating system, application programs, other program modules and program data (or some combination thereof) may include an embodiment of the systems and methods described herein.

A display device 702 can be connected to the system bus 708 via an interface, such as a video adapter 711. A user can interface with computing device 702 via any number of different input devices 703 such as a keyboard, pointing device, joystick, game pad, serial port, and/or the like. These and other input devices are connected to the processors 707 via input/output interfaces 712 that are coupled to the system bus 708, but may be connected by other interface and bus structures, such as a parallel port, game port, and/or a universal serial bus (USB).

Computing device 700 can operate in a networked environment using connections to one or more remote computers through one or more local area networks (LANs), wide area networks (WANs) and the like. The computing device 701 is connected to a network 714 via a network adapter 713 or alternatively by a modem, DSL, ISDN interface or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A system comprising:
a data source device configured to communicate with a plurality of media devices within a local area network and a network device within the local area network that maintains traffic statistics for each of the plurality of media devices coupled to the network device, the data source device being further configured to prioritize a quality of service by:
determining a policy set by a user for providing quality of service to the plurality of media devices coupled to the network device, the policy including a priority level set by the user for each of the plurality of media devices coupled to the network device, the policy including at least a first policy level set by the user for a first media device and a second policy level set by the user for a second media device to identify that the first media device is designated by the user as being more important than the second media device;
determining that there is insufficient network bandwidth to start a new data stream to the first media device due to use of network bandwidth by an on-going data stream to the second media device;
receiving, directly from the second media device, a priority level advertised by the second media device;
receiving, from the network device, traffic statistics for the second media device that is receiving the on-going data stream;
detecting from the traffic statistics that the second media device is receiving the on-going data stream at the priority level advertised by the second media device;
notifying the first media device of the second media device if the priority level advertised by the second media device violates the second priority level set by the user for the second media device;
transmitting a message to yield network bandwidth in use by the second media device if the priority level advertised by the second media device does not violate the second priority level set by the user for the second media device; and
starting the new data stream to the first media device, wherein the new data stream is started in response to the user terminating the on-going data stream to the second media device when the priority level advertised by the second media device violates the second priority level set by the user for the second media device or in response to yielding of network bandwidth in use by the second media device when the priority level advertised by the second media device does not violate the second priority level set by the user for the second media device.

2. The system of claim 1 wherein the policy for providing quality of service is configured to be remotely set by the user from any media device in the plurality of media devices.

3. The system of claim 1 wherein the first media device is configured to send the priority level set by the user for the first media device to the data source device and to all other media devices coupled to the network device via a protocol that prevents Internet Protocol spoofing.

4. The system of claim 3 wherein the protocol is TCP.

5. The system of claim 3 wherein the first priority level is configured to be set for the first media device using a password for encrypting the first priority level.

6. The system of claim 5 wherein:
the first media device and the data source device configured to participate in a security infrastructure to enable the data source device to verify the user based on the encrypting.

7. The system of claim 6 wherein at least some of the other media devices coupled to the network device are configured to participate in the security infrastructure.

8. The system of claim 7 wherein the security infrastructure is within a home network.

9. The system of claim 1 wherein the first media device comprises a first television.

10. The system of claim 9 wherein the second media device comprises a second television.

11. The system of claim 1 wherein the data source device is configured to send the message to yield network bandwidth to a different data source that is transmitting the on-going data stream to the second media device.

12. The system of claim 1 wherein the priority level advertised by the second media device is the same as the first priority level set by the user for the first media device.

13. The system of claim 1 wherein the network device comprises a networking hub or switch device.

14. The system of claim 1 wherein the network device is configured to track a number of bytes sent to and from the plurality of media devices coupled to the network device.

15. The system of claim 1 wherein:
the first media device is configured to display a message indicating that the second media device violates the second priority level set by the user for the second media device.

16. The system of claim 1 wherein the local area network is within a home network.

17. A computer-implemented method for prioritizing quality of service in a local area network which includes a plurality of media devices and a network device that maintains traffic statistics for each of the plurality of media devices coupled to the network device, the method comprising:
determining, by a data source device which is configured to communicate with the plurality of media devices and the network device, a policy set by a user for providing quality of service to the plurality of media devices coupled to the network device, the policy including a priority level set by the user for each of the plurality of media devices coupled to the network device, the policy including at least a first policy level set by the user for a first media device and a second policy level set by the user for a second media device to identify that the first media device is designated by the user as being more important than the second media device;
determining, by the data source device, that there is insufficient network bandwidth to start a new data stream to the first media device due to use of network bandwidth by an on-going data stream to the second media device;
receiving, by the data source device directly from the second media device, a priority level advertised by the second media device;
receiving, by the data source device from the network device, traffic statistics for the second media device that is receiving the on-going data stream;
detecting, by the data source device from the traffic statistics, that the second media device is receiving the on-going data stream at the priority level advertised by the second media device;
notifying, by the data source device, the first media device of the second media device if the priority level advertised by the second media device violates the second priority level set by the user for the second media device;
transmitting, by the data source device, a message to yield network bandwidth in use by the second media device if the priority level advertised by the second media device does not violate the second priority level set by the user for the second media device; and
starting, by the data source device, the new data stream to the first media device, wherein the new data stream is started in response to the user terminating the on-going data stream to the second media device when the priority level advertised by the second media device violates the second priority level set by the user for the second media device or in response to yielding of network bandwidth in use by the second media device when the priority level advertised by the second media device does not violate the second priority level set by the user for the second media device.

18. The method of claim 17 wherein the priority level advertised by the second media device is the same as the first priority level set by the user for the first media device.

19. A computer-readable storage device storing computer-readable instructions that, when executed, cause a data source device to perform a method for prioritizing quality of service in a local area network which includes a plurality of media devices and a network device that maintains traffic statistics for each of the plurality of media devices coupled to the network device, the method comprising:
determining, by the data source, a policy set by a user for providing quality of service to the plurality of media devices coupled to the network device, the policy including a priority level set by the user for each of the plurality of media devices coupled to the network device, the policy including at least a first policy level set by the user for a first media device and a second policy level set by the user for a second media device to identify that the first media device is designated by the user as being more important than the second media device;
determining, by the data source device, that there is insufficient network bandwidth to start a new data stream to the first media device due to use of network bandwidth by an on-going data stream to the second media device;
receiving, by the data source device directly from the second media device, a priority level advertised by the second media device;

receiving, by the data source device from the network device, traffic statistics for the second media device that is receiving the on-going data stream;

detecting, by the data source device from the traffic statistics, that the second media device is receiving the on-going data stream at the priority level advertised by the second media device;

notifying, by the data source device, the first media device of the second media device if the priority level advertised by the second media device violates the second priority level set by the user for the second media device;

transmitting, by the data source device, a message to yield network bandwidth in use by the second media device if the priority level advertised by the second media device does not violate the second priority level set by the user for the second media device; and starting, by the data source device, the new data stream to the first media device, wherein the new data stream is started in response to the user terminating the on-going data stream to the second media device when the priority level advertised by the second media device violates the second priority level set by the user for the second media device or in response to yielding of network bandwidth in use by the second media device when the priority level advertised by the second media device does not violate the second priority level set by the user for the second media device.

20. The computer-readable storage device of claim 19 wherein the priority level advertised by the second media device is the same as the first priority level set by the user for the first media device.

* * * * *